Figure 1:
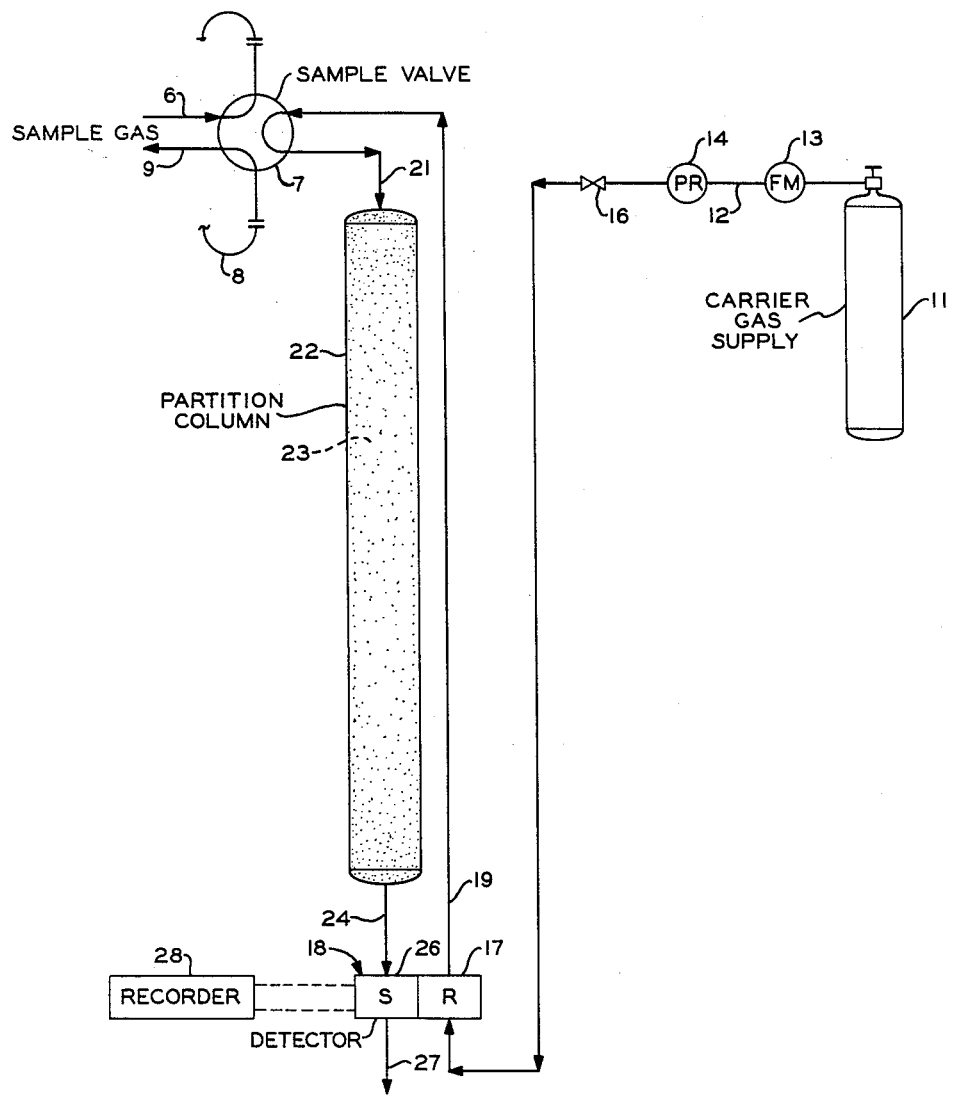

Jan. 12, 1965     R. J. LOYD     3,164,980
GAS-LIQUID PARTITION CHROMATOGRAPHY
Filed June 23, 1960     2 Sheets-Sheet 2

INVENTOR.
R. J. LOYD
BY Hudson E. Young
ATTORNEYS

United States Patent Office 3,164,980
Patented Jan. 12, 1965

3,164,980
GAS-LIQUID PARTITION CHROMATOGRAPHY
Robert J. Loyd, Bartlesville, Okla., assignor to Phillips Petroleum Company, a corporation of Delaware
Filed June 23, 1960, Ser. No. 38,386
4 Claims. (Cl. 73—23.1)

This invention relates to gas-liquid partition chromatography. In another aspect it relates to a novel partition packing or contact material for use in chromatographic analysis. In another aspect it relates to an apparatus and method of gas-liquid partition chromatography wherein such novel partition packing is used. In a further aspect it relates to a method of separating gaseous mixtures of light hydrocarbons, such as mixtures of $C_4$ and lighter hydrocarbons, by the gas-liquid partition chromatographic procedure.

Gas chromatography has recently received widespread attention and application as an analytical procedure. This method briefly comprises separating the components of a gaseous mixture in a small column packed with certain contact material, the different components of the gaseous mixture having different affinities for the contact material and as a consequence different migration velocities through the column. The separate components appear in the column effluent at different times and their presence in the effluent is detected for purposes of qualitative and quantitative evaluation of the fluid mixture.

In gas-liquid partition chromatography, the partition packing or contact material comprises a non-volatile, liquid stationary phase impregnated in or absorbed on an inert, non-adsorbent powder as a support. A gas sample is introduced onto the column of contact material in a stream of inert carrier gas or elutant, the continuous flow of the latter causing the components of the sample to separate in the column according to their distribution coefficients between the two phases.

A large number and variety of non-volatile liquids have been proposed, patented or used in the past as stationary phase partition liquids. However, many of these partition liquids have certain drawbacks which limit their application. Some of these partition liquids are limited in utility to the analysis of gaseous mixtures having components with somewhat widely differing boiling points and are not especially useful or accurate in resolving complex gaseous mixtures having components with fairly close boiling points, such as in the case of gaseous mixtures of $C_4$ and lighter hydrocarbons. Others, because of their relatively low boiling points, must be used at lower temperatures. And still others cannot be accurately employed in resolving certain gaseous mixtures because the retention times for the individual components of such gaseous mixtures are not substantially different when such partition liquids are used, and thus the chromatographic peaks of the individual components are not sufficiently separated, and concentration measurements of peak magnitude inaccurate.

Figure 2A:
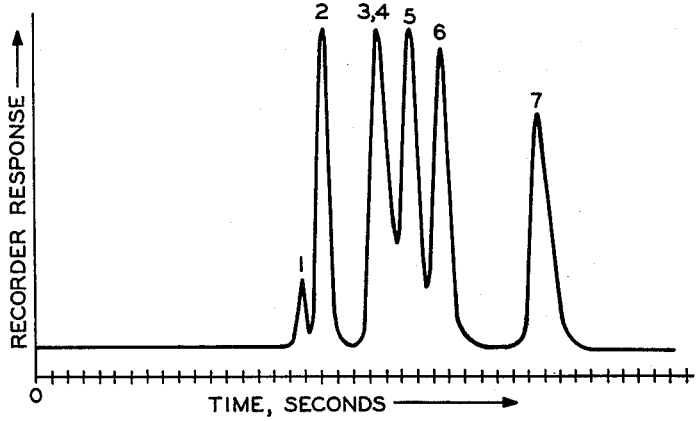
Figure 2B:
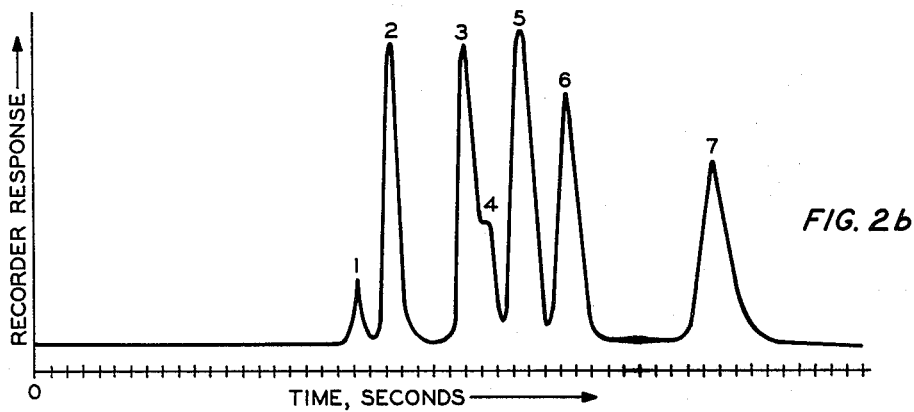
Figure 2C:
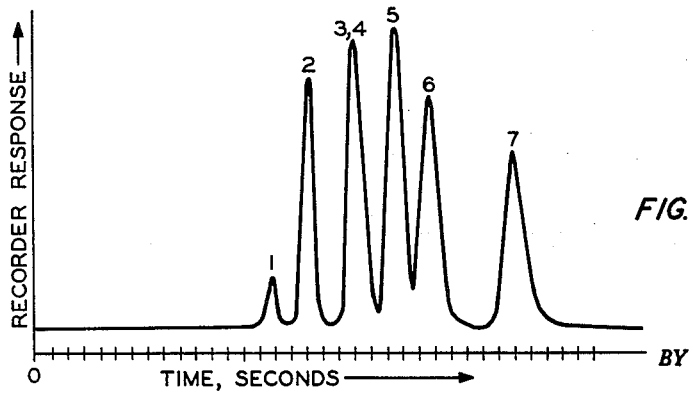

Accordingly an object of this invention is to provide a novel partition packing or contact material. Another object is to provide an improved method of gas-liquid partition chromatography using such novel partition packing. Another object is to provide an improved method of separating light, normally gaseous hydrocarbon mixtures, such as gaseous mixtures of $C_4$ and light hydrocarbons, utilizing for this purpose said improved partition packing. Further objects and advantages of this invention will become apparent to those skilled in the art from the following discussion, appended claims and drawing in which:

FIGURE 1 is a view which schematically illustrates a typical gas-liquid partition chromatographic analyzer provided with the novel partition packing of this invention; and FIGURES 2a, 2b, and 2c are typical chromatograms of gaseous hydrocarbon mixtures resolved according to the practice of this invention.

Briefly, I have discovered that dinitriles of the general formula $NC(CH_2)_nCN$, where $n$ is an integer from 4 to 8, can be used as the liquid stationary phase in a gas-liquid partition column. The partition packing or contact material of this invention is especially useful in the analysis of normally gaseous hydrocarbons, particularly gaseous mixtures of $C_4$ and lighter hydrocarbons.

Representative dinitriles useful in the practice of this invention include adiponitrile, pimelonitrile, suberonitrile, azelaonitrile, and sebaconitrile. These partition liquids have relatively low viscosities, are chemically stable in the presence of gaseous mixture samples at normal operating temperatures, and have relatively high boiling points which make them non-volatile at normal column temperatures. In particular, these partition liquids have the ability to resolve gaseous hydrocarbon mixtures, particularly gaseous mixtures of $C_4$ and lighter hydrocarbons, in a manner such that the chromatographic peaks of the individual components are substantially separated, thereby enhancing the accuracy of chromatographic peak measurements of concentration. In the resolution of gaseous mixtures of $C_4$ and lighter hydrocarbons according to this invention, the elution of unsaturated hydrocarbons is relatively delayed as compared to similar saturated hydrocarbons. These partition liquids, especially pimelonitrile, have the added advantage of enabling the separation of the difficultly separable butene-1 and isobutylene components present in gaseous mixtures of $C_4$ and lighter hydrocarbons. Also, these partition liquids, particularly adiponitrile, have the added advantage of enabling the separation of the difficultly separable ethane, ethylene, propane, propylene and butane components of gaseous mixtures of $C_4$ and lighter hydrocarbons.

The solid, inert, finely divided or powdered supports which can be coated with the partition liquids of this invention include any of those known in the art, such as diatomaceous earth, kieselguhr, firebrick, silica, activated carbon, pumice, powdered glass, ceramic beads or discs, and the like; commercially available supports which have been found especially useful are Celite and Chromosorb. The general size of the support can vary over a wide range, and the particular size employed will depend upon factors such as the length of the column, and generally will vary in size in the range between 20 to 140, preferably 40 to 60 mesh (U.S. standard sieve).

Gas-liquid chromatographic columns containing my novel partition packing can be prepared in the usual manner. Generally the preparation of the column entails weighing the powdered support and an appropriate amount of the partition liquid. The latter can be dissolved in any suitable volatile solvent to cover the powdered support. Useful solvents for this purpose include methylene chloride, petroleum ether, acetone, various liquid paraffins, etc. The powdered support is added to the solution, and the resulting slurry stirred to insure uniform wetting. The mixture can then be dried in air and sifted. The contact material can also be prepared without the use of a solvent by pouring the partition liquid on a weighed amount of the dry particuate support, and then tumbling the mixture until a uniform dispersion is obtained. The resulting partition packing is then poured into the column, vibration or tamping being employed to insure a uniform compact mass. The particular columns used can be any of those known in the art, such as glass or steel tubing of suitable diameter, e.g., ¼", and length, e.g., 4 to 60'. The resulting packed column will generally have from 5 to 50 weight percent partition liquid, preferably 10 to 30 weight percent, or, stated functionally, an amount of partition liquid sufficient to resolve and separate the individual components under consideration.

The temperature of the packed column can vary over a wide range, and generally will be within the range of room temperature to 160° C., preferably about 20° to 140° C. Since the boiling points of the partition liquids of this invention are substantially higher than these operating temperatures, essentially no loss of the partition liquid will occur during the resolution and separation of a gaseous mixture. The analysis or resolution time will vary and depend on various factors, such as column size, flow rates, temperature, etc., and generally will be from less than one minute to one hour or longer.

The inert carrier gases or elutants which can be used include any of those known in the art, such as helium, argon, nitrogen, carbon dioxide, hydrogen, air, and the like; the flow rate and pressure of the carrier gas will depend upon the column length and other factors, but generally will be within the range of 50 to 100 ml./min. and pressures in the range of 1 to 50 p.s.i.g., preferably 10 to 20 p.s.i.g.

In FIGURE 1, a typical gas-liquid partition chromatographic analyzer is shown provided with a partition column packed with the novel partition packing of this invention. In operation, a stream of a gaseous mixture desired to be analyzed is supplied via line 6 to a suitable conventional sample valve schematically shown in the drawing and designated 7, this valve adapted to trap a known and determinable volume of gas, e.g. 0.01–25 cc., in a sample loop 8, the gaseous mixture after having trapped the sample being passed to vent via line 9. A supply 11 of carrier gas, such as helium, is provided, carrier gas supply line 12 being provided with the usual flow meter 13, pressure regulator 14, and flow restriction valve 16. The carrier gas flows through the reference side 17 of a suitable conventional chromatographic detector 18, such as a thermoconductivity detector, and thence via line 19 to sample valve 7, wherein it picks up the trapped sample from sample loop 8 and sweeps the same via line 21 onto the inlet section of column 22 packed with the novel partition packing 23 of this invention. Continuous flow of the carrier gas into the column causes the resolution and separation of the components of the gaseous mixture sample. Eventually, the separated components of the gaseous mixture sample appear in the column effluent line 24, together with carrier gas, the presence of the components in the effluent being detected in the sensing side 26 of detector 18, the effluent thereafter being passed to vent via line 27. The detector 18 is connected to a suitable conventional recorder 28, such as that provided with a strip chart and moving pen, wherein the responses of detector 18 are recorded graphically in the form of chromatograms. After all of the components of interest have been separated and detected, the partition column 22 is purged by further flow of carrier gas, after which the column is in condition for another sample analysis.

Further description of the chromatographic analyzer of FIGURE 1 will not be detailed in the interest of brevity, since except for the novel partition packing of this invention such analyzer is conventional and its operation well known to those skilled in the art.

The partition packing of this invention will be useful in analyzing by means of gas-liquid chromatography many gaseous mixtures, particularly mixtures of normally gaseous hydrocarbons, such as gaseous mixtures of $C_4$ and lighter hydrocarbons.

The following examples further illustrate the objects and advantages of this invention, but it should be understood that these examples are not to be construed so as to unduly limit this invention.

EXAMPLE I

In Table I there are listed the retention times of various pure gaseous compounds, obtained by carrying out individual runs on such compounds according to the practice of this invention. Such retention times will be of substantially the same magnitude as those obtained for the same compounds when they are present as constituents in gaseous mixtures analyzed under the same conditions. The partition packing of this invention used in obtaining the retention times of Table I consisted of a mixture of 30 weight percent of the partition liquid and 70 weight percent of Celite firebrick (35–80 mesh), packed in a column measuring ¼" in diameter and 55' in length with 6400 calculated theoretical plates. The carrier gas used was helium at a flow rate of 90 ml./min. and a pressure of 30 p.s.i.g. The temperature of the column during the separation was 140° F. The chromatographic analyzer used was a Perkin-Elmer Model 184 having a thermal conductivity detector and a Leeds and Northrup self-balancing potentiometer.

*Table I*

| Constituent | Partition liquids | |
|---|---|---|
| | Adiponitrile, min. | Pimelonitrile, min. |
| Air | 7.23 | 7.22 |
| Methane | 7.51 | 7.51 |
| Ethane | 8.35 | 8.45 |
| Ethylene | 8.89 | 9.01 |
| Propane | 9.80 | 10.00 |
| Isobutane | 11.25 | 12.4 |
| Propylene | 12.08 | 11.7 |
| n-Butane | 12.90 | 14.2 |
| Butene-1 | 17.30 | 18.8 |
| Isobutylene | 18.24 | 19.9 |
| Trans-butene-2 | 19.67 | 21.8 |
| Cis-butene-2 | 22.14 | 24.4 |
| Butadiene-1,3 | 29.62 | 31.8 |

Examination of the data of Table I shows that there are sufficient differences in the retention times of adjacent compounds to enable ready and accurate detection and analysis of such compounds when they are present in the same gaseous sample, these differences in retention times indicating such samples will be completely resolved when the partition packing of this invention is used.

EXAMPLE II

In this example, three different packed chromatographic columns were prepared according to this invention, each comprising 10 weight percent partition liquid and 90 weight percent Chromosorb firebrick (80–100 mesh). The columns containing the adiponitrile and pimelonitrile partition liquids measured ⅛" in diameter and 6' in length, and the column containing the sebaconitrile measured ⅛" in diameter and 4' in length. These columns were used in separating Phillips 66 Hydrocarbon Mixture Number 37. The separations were carried out at 25° C., using hydrogen as the carrier gas. A flame ionization detector and a Sanborn Model 150 Recorder were used in detecting and recording the sample components. Retention times of the various constituents of this gaseous mixture, and the composition of the latter, are set forth in Table II. Chromatograms of the resulting resolved gaseous mixtures utilizing adiponitrile, pimelonitrile, and sebaconitrile partition liquids are represented in FIGURES 2a, 2b, and 2c, respectively.

Table II

| Constituent | Concentration | Peak No. in Figure 2 | Partition liquids | | |
|---|---|---|---|---|---|
| | | | Adiponitrile, sec. | Pimelonitrile, sec. | Sebaconitrile, sec. |
| Isobutane | 2.98 | 1 | 16.8 | 20.0 | 14.8 |
| n-Butane | 14.00 | 2 | 18.2 | 22.1 | 16.8 |
| Butene-1 | 16.94 | 3 | 21.6 | 26.9 | 19.7 |
| Isobutylene | 7.02 | 4 | 22.3 | 28.2 | 20.4 |
| Trans-butene-2 | 22.02 | 5 | 23.7 | 30.3 | 22.4 |
| Cis-butene-2 | 19.02 | 6 | 25.7 | 33.2 | 24.5 |
| Butadiene-1,3 | 18.02 | 7 | 32.0 | 42.4 | 29.9 |

The data of Table II and the chromatograms of FIGURE 2 shows that effective resolution of the gaseous mixture was achieved with each of the partition liquids. Moreover, the use of pimelonitrile as the partition liquid gave the best resolution of the most difficultly separable pair, butene-1 and isobutylene, indicating that this particular partition liquid will give the optimum resolution of these two compounds. Of course, with a longer column length, a more complete resolution could be obtained.

Various modifications and alterations of this invention will become apparent to those skilled in the art from the foregoing discussion and drawing, and it should be understood that this invention is not to be unduly limited thereto.

I claim:

1. In a method for analyzing a gaseous mixture by gas-liquid partition chromatography, comprising contacting said gaseous mixture in a stream of inert carrier gas with a column of partition packing material comprising inert particulate support material and adiponitrile as a stationary phase, whereby said gaseous mixture is separated into components thereof.

2. The method according to claim 1 wherein said gaseous mixture comprises a gaseous mixture of $C_4$ and lighter hydrocarbons.

3. In a method for analyzing a gaseous mixture by gas-liquid partition chromatography, comprising contacting at a temperature in the range from about 20° to 160° C. a sample of said gaseous mixture in a stream of an inert carrier gas with an elongated column packed with partition packing material comprising inert particulate support material, and from about 5 to 50 weight percent of adiponitrile as a stationary phase, whereby said gaseous mixture is separated into its components, passing inert carrier gas through said column to separately elute therefrom said components, and detecting said eluted components in the gaseous column effluent.

4. Apparatus for carrying out gas chromatographic analysis of gaseous mixtures, comprising an elongated column packed with partition packing material comprising inert particulate support material and adiponitrile, said column having an inlet and an outlet, means for introducing a sample of said gaseous mixture onto said column via said inlet, and means for detecting eluted components of said gaseous mixture in said outlet.

References Cited in the file of this patent
UNITED STATES PATENTS

| 2,841,537 | Guyler et al. | July 1, 1958 |
| 2,867,628 | Cass | Jan. 6, 1959 |
| 2,875,606 | Robinson | Mar. 3, 1959 |
| 2,985,007 | Boeke | May 23, 1961 |

OTHER REFERENCES

Journal of American Chemical Society, volume 81, June 5, 1959, pages 2692 and 2802.

Analytical Chemistry, Separation of $C_4$ and Lighter Hydrocarbons by Gas-Liquid Chromatography, volume 31, No. 12, December 1959, pages 2000 to 2003, note received for review May 7, 1959, accepted September 3, 1959, Gulf Coast Spectroscopic Group Meeting, March 13, 1959.